United States Patent [19]

Tsuyuki

[11] Patent Number: 5,351,059
[45] Date of Patent: Sep. 27, 1994

[54] NAVIGATION SYSTEM AND METHOD THEREFOR

[76] Inventor: Toshio Tsuyuki, 865-1-3-352, Kajiya, Yugawaracho, Ashigarashimo-Gun, Kanagawa-Ken, Japan

[21] Appl. No.: 834,552
[22] PCT Filed: Aug. 21, 1990
[86] PCT No.: PCT/JP90/01064
§ 371 Date: Feb. 14, 1992
§ 102(e) Date: Feb. 14, 1992
[87] PCT Pub. No.: WO91/02943
PCT Pub. Date: Mar. 7, 1991

[30] Foreign Application Priority Data

| | | | |
|---|---|---|---|
| Aug. 24, 1989 | [JP] | Japan | 1-216159 |
| Sep. 14, 1989 | [JP] | Japan | 1-236845 |
| Oct. 5, 1989 | [JP] | Japan | 1-258831 |
| Nov. 30, 1989 | [JP] | Japan | 1-309259 |
| Nov. 30, 1989 | [JP] | Japan | 1-309260 |
| Dec. 13, 1989 | [JP] | Japan | 1-321557 |
| Apr. 6, 1990 | [JP] | Japan | 2-90298 |

[51] Int. Cl.$^5$ .............................................. G01S 3/02
[52] U.S. Cl. .................. 342/457; 342/357; 364/449; 340/990; 340/995
[58] Field of Search ............... 342/357, 457; 364/449; 340/990, 995

[56] References Cited

U.S. PATENT DOCUMENTS

| | | | |
|---|---|---|---|
| 4,743,913 | 5/1988 | Takai | 342/357 |
| 4,928,107 | 5/1990 | Kuroda et al. | 342/357 |
| 5,043,902 | 8/1991 | Yokoyama et al. | 364/449 |

FOREIGN PATENT DOCUMENTS

| | |
|---|---|
| 3509708 | 9/1985 Fed. Rep. of Germany . |
| 3515471 | 11/1985 Fed. Rep. of Germany . |
| 3842179 | 6/1989 Fed. Rep. of Germany . |
| 50-148788 | 11/1975 Japan . |
| 57-25764 | 6/1982 Japan . |
| 58-53282 | 11/1983 Japan . |
| 60-48600 | 3/1985 Japan . |
| 61-264210 | 11/1986 Japan . |
| 2-57910 | 2/1990 Japan . |

OTHER PUBLICATIONS

Ian Catling and Peter Belcher, "Autoguide—Route Guidance in the United Kingdom", 1989, IEEE, pp. 467–473.
Fuminori Morisue and Ken Ikeda, "Evaluation of Map–Matching Techniques", 1989, IEEE, pp. 23–28.
Clyde B. Harris et al. "Digital Map Dependent Functions of Automatic Vehicle Location Systems;" IEEE Plans '88 Position Location and Navigation Symposium, Nov. 29–Dec. 2, 1988; pp. 79–87.

*Primary Examiner*—Theodore M. Blum
*Attorney, Agent, or Firm*—Oliff & Berridge

[57] ABSTRACT

A navigation system and a method therefor arranged to be mainly adapted to a driver but the same is as well as adapted to a pedestrian as a portable type according to an embodiment in which devices such as a distance sensor and an azimuth sensor are not used. When information about the passage through which a moving object is moving at this very moment, such as a signal transmitted from a transmitter disposed in each passage, electric waves emitted from an orbit satellite, results of detections made by the distance sensor and the azimuth sensor or information supplied by a user, is supplied, an estimation of a result of a travel through the passage while performing no right or left turn, and an estimation of a result of a travel through a lane the way of which is particularly determined previously are respectively indicated as a travelling line. When a target is set, both the target and the travelling line are indicated on the screen of a display device. Simultaneously, the passage at which the target confronts and a passage which constitutes a proper and correct course from a main passage to the target are indicated. Data about the passage is retrieved by means of codes given such that a group code and a common code are given to each link.

39 Claims, 4 Drawing Sheets

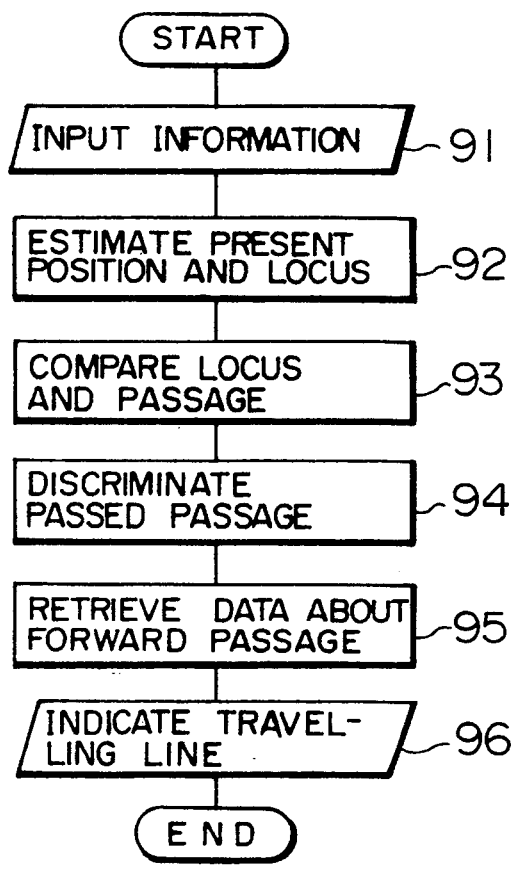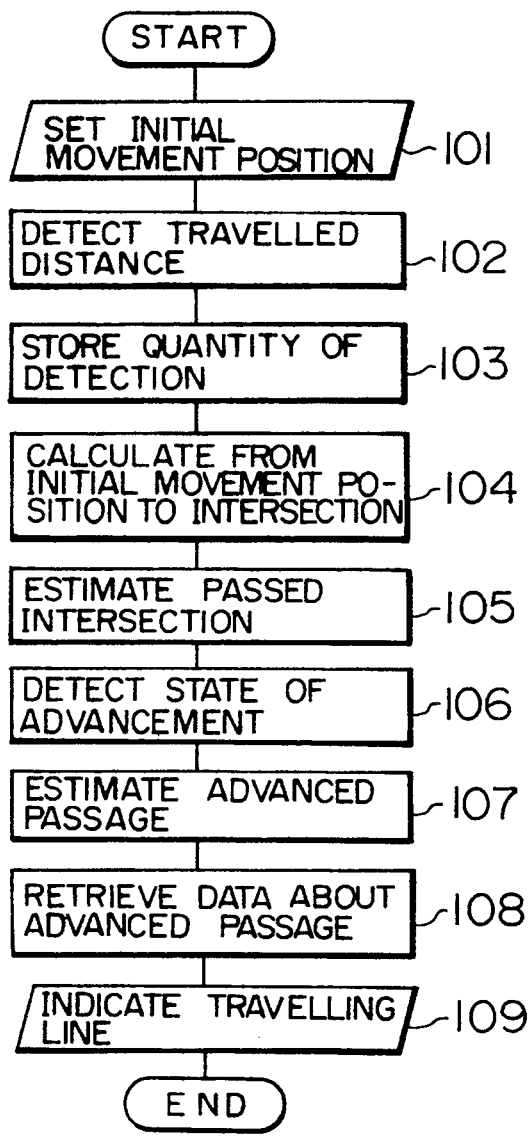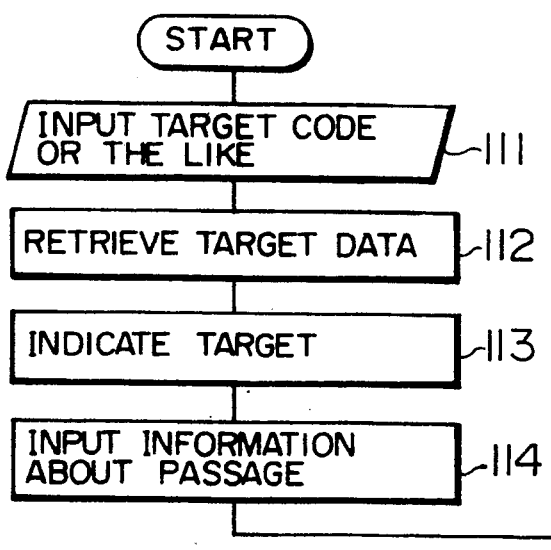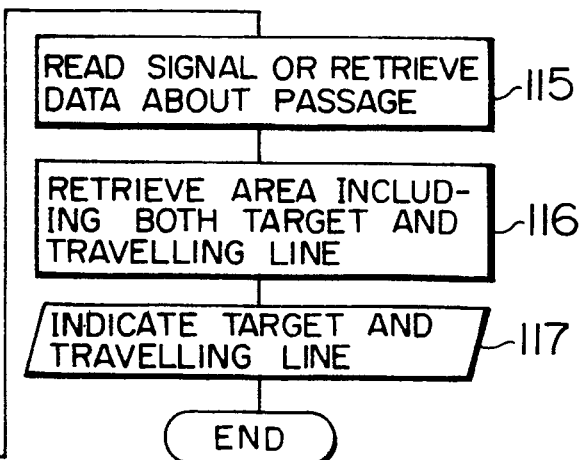

NAVIGATION SYSTEM AND METHOD THEREFOR

TECHNICAL FIELD

The present invention relates to a navigation system which is mainly used by a driver of an automobile and a method therefor.

BACKGROUND ART

A conventional navigation system having a storage device, a processing device, an input device, a display device, sensors and the like and a navigation method to be executed in the system may be classified into the following two types on the basis of the contents displayed on the display device as driving information provided for a user.

One of the two types is a map display system which is arranged in such a manner that a map is displayed on the screen of the display device and a travelling locus, a present position, a moving direction, a target, a target direction, an instructed course or the like are indicated in the map. Another one is an arrow display system which is arranged in such a manner that no map is displayed but arrows respectively showing the target direction and the course instruction at each intersection are indicated.

The map display system and the arrow display system respectively have encountered the following problems:

According to the map display system, a driver must look at the displayed map while driving a vehicle. Therefore, the driver must pay attention to many factor and thereby the driver will be exhausted, causing a load to be applied to the driver. Furthermore, a risk will arise as the case may be. Therefore, in the conventional map display system, the display device has been disposed in a lower position so that the driver cannot look at it during driving, or only main roads are indicated during driving. However, these devices could not satisfactorily overcome the problems and thereby a risk in terms of traffic safety remains. Because of the risk, the European countries have denied the map display system and therefore they have not employed the map display system.

The arrow display system encounters the following two typical problems: In a case where the target direction is shown by an arrow as one of the display modes of the display device, the driver psychologically tends to perform earlier turns to the right or left in accordance with the shown arrow, causing a problem to arise, for example, the vehicle strays in a residential area. Furthermore, in a case where the course is instructed at an intersection as another display mode, timing at which traffic information collected in real time is indicated and acceptability for the drivers, which becomes a serious problem for the aged and female drivers, remain as unsolved problems, because there is a course instruction as the assumption.

According to a basic system design concept used for developing the conventional navigation system, the most important factor for the navigation system lies in that the present position of the user's vehicle, which is moving, is accurately recognized in a map (road map) which has been previously prepared. This system design concept is similarly applied to both the map display system and the arrow display system.

However, the conventional navigation system developed in accordance with the basic system design concept has been restricted by the system design concept and thereby it is of no practical use at present.

That is, since the vehicle such as an automobile moves at considerably high speed, it is not so practical for the driver even if the driver recognizes the present position of the vehicle as a point of low accuracy on the road map displayed on the display device. That is, it is rather acceptable for the driver who is driving the vehicle, in the aspects of the speed sensibility and the sense about the positional relationship and the directional relationship with respect to his target, that the driver recognizes the state of the vehicle's movement as a line while making the positional relationship with respect to the target clear than recognizing the present position indicated as a point, on the screen of the display device. It is easier and more natural for the driver to recognize the state of the vehicle's movement as the line than to recognize the state of the movement as the point. Furthermore, information about the state of the movement as the line is more valuable as available drive information. In addition, since the user's vehicle such as an automobile must move while being restricted by a road in a different manner from an airplane and a ship, it is more practical to recognize the road on which the user's vehicle is moving at a particular moment while making the positional relationship with the target for the user's vehicle clear than obtaining the present position of the user's vehicle as a point.

Furthermore, if the present position of the user's vehicle is intended to be accurately obtained, the load of realizing the high accuracy becomes too heavy for the navigation system. As a result, the cost for manufacturing the navigation system cannot be reduced and thereby wide use of the navigation system will be interrupted. Therefore, the primary ideal of preventing the traffic snarl and realizing the safety traffic cannot be achieved.

It is very dangerous for the driver to drive his vehicle while actually looking for a road. Therefore, there has been a desire of a practical navigation system to be developed as a system of aiding the driver to easily reach the position of the target. According to the conventional navigation system arranged in accordance with the map display system, the driver must look for the driving course set on the road map displayed on the display device. Therefore, the dangerous factor cannot be eliminated and thereby its practicality is insufficient.

Since the driver must pay attention to many things during driving the vehicle, the load of the driver must be reduced for the purpose of safely driving the vehicle. Therefore, it is preferable that a navigation system be arranged in such a manner that information necessary to select the course can be obtained at first glance.

According to the conventional navigation system arranged in accordance with a route guide system in which the driving course through which the vehicle reaches the target is indicated on the display device, an optimum driving course is set in accordance with the relationship between the start position and the target position at the time of start of driving. According to the above-described navigation system arranged in accordance with the route guide system, it is actually difficult to drive the vehicle while keeping the driving course in the actual road state even if the driving course is indicated on the display device. Furthermore, the degree of the danger can be increased due to stress given to the driver when the determined driving course is instructed for the driver.

However, if the instruction by means of indicating the driving course is not made but only the present position of the user's vehicle is indicated, the value of information is insufficient. It is more dangerous to look for the course in accordance with the present position shown on the road map displayed on the display device than to instruct the driving course.

It is important for the navigation system to, via the display device, show the driver information which is valuable to reach the target in a state in which safety cannot be deteriorated. In particular, intense stress is given to the driver if the optimum driving course to reach the target is determined before the start of driving and the one fixed driving course is shown to the driver. In order to prevent the state in which the stress is given to the driver, it is preferable that the navigation system be constituted in such a manner that the driver is able to select a course to reach the target and the driver's determination about the selected course is given priority. As a result, the driver is able to drive the vehicle with composure.

Furthermore, the current background in which the aged and the female drivers increase must be taken into consideration. In addition, the mental state and recognition of the driver in a specific situation must be considered.

Therefore, it is insufficient for the display device to indicate the present position of the user's vehicle on the road map. In addition, it is an excessive function to indicate the driving course on the map.

An object of the present invention is to provide a significantly practical navigation system and a method therefor capable of overcoming the above-described problems and meeting the above-described requirements by regarding information about the movement state of a moving object as a line as important and employing a concept of a "line representing a passage through which the moving object is moving at this very moment", that is a "travelling line", whereby necessary and minimum practical information is supplied to a user such as a driver to cause the user to independently select the course.

Another object of the present invention is to provide a navigation system and a method therefor in which a novel and practical navigation display system is employed which is completely different from the conventional map display system and the arrow display system in terms of the display method and which is arranged completely different from the course guide system in terms of a navigation principle such that the driving course is not set previously but a user is able to independently make the driving course while selecting a course in accordance with the determination about driving made by the user.

SUMMARY OF THE INVENTION

According to the present invention, there is provided a navigation system and a method therefor arranged in such a manner that coordinates and various data items about positions are stored in a storage device as needed, a processing device performs a predetermined process when predetermined information is supplied via an input device and a display device indicates the result of the process, wherein, when information about a passage through which a moving object is moving at this very moment is supplied by means of any one or some of a receipt of a signal transmitted from a transmitter, a receipt of satellite electric waves, detections of a distance sensor and an azimuth sensor and an operation of a user, a line (hereinafter referred to as a "travelling line") representing the passage through which the moving object is moving at this very moment is, together with information about a target such as a target position, indicated on the screen of the display device while always making the positional relationship with the target clear.

The "passage through which the moving object is moving at this very moment" means a passage through which the "moving object", on which the main unit of the navigation system is mounted, is moving at this very moment. For example, the passage is a passage the start point of which is defined by a point at which turning to the right/left is performed at an intersection and the end point of which is defined by a final point to which the moving object is able to reach in a case where the moving object moves without performing turning to the right/left after turning to the right/left at the intersection. The passage through which the moving object is moving at this very moment is changed in accordance with the movement of the moving object while repeating turning to the right/left. Therefore, in principle, information about a particular passage through which the moving object is moving at this very moment is obtained whenever the passage through which the moving object is moving at this very moment is changed, and when obtaining the information about the passage, a line representing the passage through which the moving object is moving at this very moment is generated. Thus, the line representing the passage through which the moving object is moving at this very moment shown on the screen of the display device is updated. The "information about the passage through which the moving object is moving at this very moment" means information from which data about the shape and the position of the passage through which the moving object is moving at this very moment can be finally obtained. The meaning of the line representing the passage through which the moving object is moving at this very moment, that is, the "travelling line" will be concretely described later.

The navigation system and the navigation method according to the present invention are characterized in that the travelling line (the line representing the passage through which the moving object is moving at this very moment) and the target for the moving object to reach are always indicated on the screen of the display device, and a driver or the like can move to reach the target by selecting freely at the driver's will a passage through which the driver or the like wants to pass on the basis of the recognition of the positional relationship between the travelling line and the target on the screen. The travelling line indicated on the screen of the display device is updated whenever the driver selects another passage due to turning to the right/left. As described above, the travelling line is updated with the movement of the moving object in accordance with a selection of the driving course at the driver's will or the like. Therefore, the travelling line is completely different in terms of its concept from the driving course which is described in the background art and which is previously determined before the start of driving between the start point and the target.

The present position of the moving object is indicated on the screen of the display device as needed. Since the present position of the moving object can be ascertained from the conditions when making the travelling line indicated or the positional relationship with the target, the particular necessity of clearly indicating the present position is not required. Furthermore, it is not necessary to, on the screen of the display device, display the road map about a region in which the moving object is moving at this very moment.

As will be described below, the present invention has a plurality of embodiments so as to select a proper embodiment in accordance with the purpose and way of use of the present invention. According to these embodiments, a variety of configurations for variously generating the travelling line and states of indication mode on the screen of the display device are explained.

A preferred aspect of the present invention lies in a navigation system and a method therefor arranged in such a manner that transmitters are disposed in the passages and a signal to be transmitted from the transmitter is given data about the shape and the position of the passage in which the transmitter is disposed, whereby, when a main unit of the navigation system mounted on the moving object and having a signal receiving function receives the signal, a travelling line representing the passage through which the moving object is moving at this very moment is indicated on the display device. Furthermore, a configuration may be constituted in such a manner that a code is given to the signal to be transmitted from the transmitter, data about the shape and the position of the passage is stored in a data storage device of the main unit, data about the shape and the position of the passage which corresponds to the code read from the signal is retrieved from the data stored in the storage device on the basis of the code read from the signal and the travelling line is indicated on the basis of the retrieved data.

A preferred aspect of the present invention lies in a navigation system and a method therefor arranged in such a manner that data about the shape and the position of a passage is stored in the data storage device, data corresponding to the passage through which the moving object is moving at this very moment is retrieved from data stored in the data storage device when information which can be recognized by a user when the user moves through the passage and with which the passage through which the moving object is moving at this very moment can be specified and the travelling line is indicated.

A preferred aspect of the invention lies in a navigation system and a method therefor arranged in such a manner that the present place (present position) is estimated on the basis of satellite electric waves, or a distance sensor and an azimuth sensor, a passage which is nearest to the estimated present position is discriminated, data about the shape and the position of the passage is retrieved from data stored in a data storage device and it is indicated as a travelling line. A configuration may be employed which is arranged in such a manner that a locus of a passage which can be considered that the moving object has passed through is obtained on the basis of the estimated present position, the passage through which the moving object has passed is discriminated on the basis of a result of a comparison made between the locus and the shape of the passage, data about the shape and the position of the passage which is positioned in front of the passage through which the moving object has passed and through which the moving object will pass through if it does not turn to the right/left is retrieved from data stored in the data storage device and it is indicated as a travelling line.

A preferred aspect of the present invention lies in a navigation system and a method therefor arranged in such a manner that it comprises a distance sensor and an azimuth sensor, the passages which intersects each passage are, together with the state of advancement into the intersection, stored, the distance between the intersections is stored, the distance from the initial movement position is detected by the distance sensor, the distance from the initial movement position to each intersection is obtained, the stored distance and said quantity of detection are subjected to a collation, the intersection which is passed at the time of the detection is estimated on the basis of the collation, the passage into which the moving object has been advanced is estimated on the basis of the detected state when the state of the advancement into the intersection is detected, data about the shape and the position of the passage into which the moving object has been advanced is retrieved from data stored in the data storage device and a travelling line representing the shape and the position of the passage is indicated on the display device. Another configuration may be employed in which the state of advancement of the user into the intersection is supplied in place of the detection of the azimuth performed by the azimuth sensor to estimate the passage into which the user has advanced, data about the shape and the position of the passage into which the user has advanced is retrieved from data stored in the data storage device and the passage is indicated as the travelling line.

As described above, according to the present invention, generating and indicating of the travelling line can be realized by a variety of configurations. In the configuration according to the present invention, a passage to the end point of the passage which can be selected if the moving object moves without performing turning to the right/left or along a course in which the driving is regulated is, as information necessary and sufficient for a driver or the like to select a course and in the form of information called the "travelling line", indicated on the screen of the display device. The concept of the display information called the "travelling line" has not been disclosed according to the conventional navigation systems.

The navigation system and the method therefor according to the present invention treat the target for the moving object to reach as follows:

The configuration is constituted in such a manner that the coordinate position of the target is supplied so that codes about name of the target, the number given to the target and the name are supplied to retrieve data about the target on the basis of the supplied information and information about the target such as the target position is indicated on the screen of the display device.

In a case where information supplied to the main unit or information supplied for the purpose of retrieving data about the passage to indicate the travelling line includes information about the present position, an area to which both the present position and the target position belongs is retrieved and the area is displayed on the display screen and as well as the target position and the travelling line on which the present position or an equivalent position in place of the present position are positioned are indicated on the display screen. The supplied information including information about the present position is exemplified by a case in which a signal transmitted from the transmitter includes information about the position at which the transmitter is disposed, a case in which inputting is performed in accordance with the name of the intersection, the name of a place, the lot number and the name of the roadside facility, a case in which a specific coordinate position is supplied, a case in which the code numbers which correspond to elements showing the above-described positions substantially show the equivalent place in place of the present position and a case in which information about the estimated present position is supplied.

As described above, information about the target (for example, the target position) and the line (travelling line) representing the passage through which the user's vehicle is moving at this very moment are always indicated on one common display screen. Therefore, the user is, at first sight of the display screen, able to determine the selection of the course through which the user is able to reach the target on the basis of the relationship with the actual driving situation.

That is, when the driver or the like, who is a user, looks at the travelling line indicated on the display screen, the user is able to quickly, easily, extemporaneously and at free will determine to go straight along the passage through which the user's vehicles is moving at this very moment, or turn to the right or left into another passage in accordance with the positional relationship with the target.

The travelling line serving as information with which the moving object is able to reach the target is superior information with which the determination is made to conventional information used in the conventional navigation technology such as the locus, the present position, the target direction and the moving direction. Furthermore, the configuration according to the present invention is arranged in a manner different from the configuration in which a previously set optimum driving course, is instructed but the same is arranged in such a manner that the determination made by a driver or the like is given priority. Therefore, the load and danger of the driver can be eliminated from the psychological viewpoint and a significantly preferable effect can be obtained in terms of traffic safety.

In addition, information, that is, the present position of the moving object is not obtained but only the line representing the passage through which the moving object is moving at this very moment must be grasped. Therefore, the restriction involved in the conventional system in which the driving course and the moving object must be continuously aligned with each other on the road map displayed on the display screen can be eliminated. As a result, the load in terms of the accuracy applied to the navigation system can be reduced.

If information for specifying the passage is once supplied, in accordance with the most simple configuration, the travelling line can be generated and indicated. Therefore, the ensuing necessity of estimating the present position by means of the navigation system can be eliminated to make it serve as the navigation system.

In each mode of the present invention, the configuration is constituted in such a manner that the present position of the user's vehicle or an equivalent place in place of the present position, an intersection line representing the passage which intersects the passage through which the user's vehicles is moving at this very moment, the intersection of the travelling line and the intersection line, the moving direction and the locus are, as secondary determination information, indicated. As a result, a variety of requests made in each mode can be met while making the indication of the travelling line to be the basic function.

Furthermore, a preferred aspect of the present invention can be constituted in such a manner that data about the shape and the position of the passage at which the target confronts is stored in the data storage device, data about the target position and data about the passage which confronts the target are retrieved when a target is set, the target position is indicated on the display device and a line representing the passage which confronts the target is indicated on the display device. Another configuration example may be arranged in such a manner that data about the shape and the position of a passage which constitutes a course through which the moving object is able to properly correctly reach the target from a main passage positioned near the target is, together with data about the shape and the position of the passage at which the target confronts, stored in the data storage device. Thus, when a target is set, data about the target position and data about the shape and the position of the passage at which the target confronts are retrieved and data about the shape and the position of the passage which constitutes the course through which the moving object is able to reach the target is retrieved and the target position and the line representing the passage at which the target confront are indicated on the display device and as well as the line representing the passage which constitutes the course through which the moving object is able to reach the target is indicated on the display device.

As a result of the thus-made configuration, the passage and the travelling line with which an access to the target can be made are clearly shown on the display screen. Furthermore, by arranging the configuration in such a manner that the passage which is able to be adapted to the directional regulation is formed into data and the above-described passage is indicated or the regulation is clearly indicated, the moving object is significantly easily able to reach the target.

Furthermore, the present invention can be constituted in such a manner that the target and the travelling line are not indicated on one display screen. According to this example of display, the configuration is constituted in such a manner that the target direction is retrieved while making the central point or arbitrary points of an area displayed on the display screen in which the travelling line is indicated to be a start point and the target direction is, together with the travelling line, indicated by an arrow or the like.

As a result of the thus-arranged configuration, in a case of a mode of the present invention in which the present position and an equivalent position in place of the present position is not used as the assumption, for example, in a case where the travelling line is indicated when a user supplies the name or the code of the passage as information, in a case where it is difficult to display the target and the travelling line in one area due to the restriction caused from data, or in a case where the present position cannot be detected due to some trouble, the system according to this mode is able to serve as a supplementary function to aid the driver or the like to select the course. Furthermore, since the travelling line is indicated, the arrow representing the target direction does not trouble the user. Therefore, this mode of the present invention is able to serve as a satisfactory effective navigation system.

Furthermore, according to the mode of the present invention in which the distance sensor and the azimuth sensor are not required, the navigation system and the method therefor according to the present invention can be utilized as a portable apparatus adaptable to a pedestrian. Also according to this mode, the travelling line and the target are indicated in a manner different from the conventional configuration in which the map is displayed. Therefore, the user is able to recognize the direction of movement to reach the target.

Since an effect as a navigation system and a method is obtained because the target and the travelling line are indicated on the display screen, the contents of display can be simplified, causing a plurality of advantages to be realized.

In a case where the arrow display system, the size of the display screen can be reduced. However, a predetermined size of the display is required in the map display system. In a case where the present position is shown, it must be collated with the circumferential state after it has been confirmed in the map. Therefore, background information must be sufficiently shown in the map, causing a necessity to arise in that the size of the display screen must be enlarged.

On the other hand, since background information is an indispensable factor according to the present invention, the size of the screen can be reduced and as well as a wide area can be displayed as practical and meaningful information.

By combining the navigation system and the method therefor according to the present invention with information about traffic snarl, the user is able to previously detour the snarl. Furthermore, an aid system can be provided with which driving can be performed in such a manner that a driver is able to select a passage to detour the snarl after the driver has confirmed the actual degree of the traffic snarl.

According to the present invention, by combining with a navigation system of another course guide system, it can be provided as information source to freely select the course which is deviated from the instructed course in a case where although the optimum course has been instructed, the moving object is deviated from the optimum course during driving or in a case where the instructed course is not accepted by a female or the aged driver because the traffic volume is too large in the instructed course or the traffic speed is too high in the above-described course.

BRIEF DESCRIPTION OF DRAWINGS

FIG. 6 is a flow chart which corresponds to embodiment 10;

FIG. 7 is a flow chart which corresponds to embodiment 12;

FIG. 8 is a flow chart which corresponds to embodiment 24; and

DETAILED DESCRIPTION OF PREFERRED EMBODIMENTS

Embodiments of the present invention will now be described hereinafter with reference to the drawings.

Figure 1:
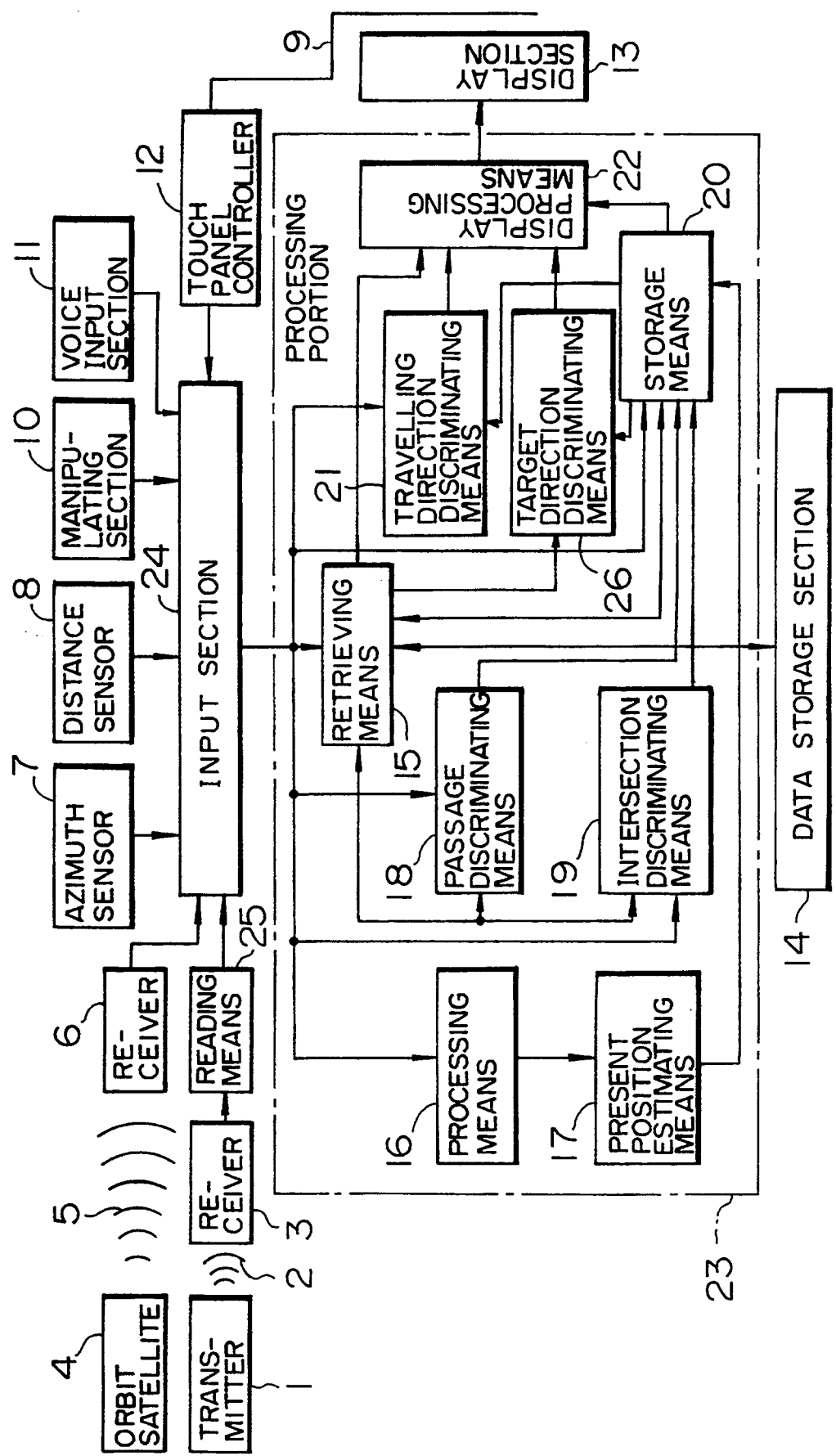
FIG. 1 is a block diagram which illustrates an embodiment of a navigation system according to the present invention.

FIG. 1 illustrates the configuration of a navigation system according to the present invention. The illustrated navigation system collectively includes all of the components. It is preferable that the elements of the system may be selectively employed at the time of a practical use as described later. The sequence illustrated by each of the illustrated flow charts partially shows the characteristic sequence of the navigation method according to the present invention. Therefore, they may be combined with one another as desired at a practical use.

The navigation system shown in FIG. 1 is composed of two sections. A first section comprises a main unit with an auxiliary device, which is mounted on a "moving object" such as an automobile or a human body. The main unit has a function of receiving a signal given from the outside, a function of generating data by utilizing its internal device and the auxiliary device and a function of making the obtained signal or data. A second section is an external unit disposed on the outside of the main unit, the second section being a unit for supplying a signal including required information to the main unit. Then, the description will be made hereinafter on the assumption that the "moving object" is an automobile. The automobile provided with the main unit is defined as a "user's vehicle".

Referring to FIG. 1, a signal 2 emitted from a transmitter 1 disposed on a passage includes data showing the shape and the position of the passage on which the transmitter 1 is disposed, or a code for retrieving the data relating to the passage, or other information about an intersection and a crossing or the like. An orbit satellite 4 irradiates electric waves 5 including information for estimating the position of the user's vehicle. The signal 2 is received by a receiver 3, while the electric waves 5 are received by a receiver 6.

The transmitter 1 and the orbit satellite 4 correspond to the above-described external unit.

It is preferable that the transmitting section of the transmitter 1 and the receiving section of the receiver 3 are respectively housed in chambers each having members for shielding signals on its side and rear portions and arranged in such a manner that an opening is formed in its front portion. As a result, a directivity in the transmission and the receipt of the signal 2 is given.

An azimuth sensor 7 and a distance sensor 8 are devices for use to estimate the present position of the user's vehicle after a travel, the azimuth sensor 7 and the distance sensor 8 being arranged to respectively detect the azimuth and the distance.

A touch panel 9 having a touch panel controller 12, a manipulating section 10 and a voice input section 11 respectively receive an input operation of an operator such as a driver. A data storage section 14, as described in each embodiment of the present invention to be described later, stores any one of required data about the shape and the position of the passage, information about the intersections and crossings, data about the target and the shape and the position of the passage through which the moving object is able to reach to the target, coordinates and other map data in a manner corresponding to each embodiment of the present invention. A processing section 23 makes a variety of data items to be described later in accordance with a program stored in a storage device (not shown in FIG. 1). Means for realizing a variety of functions as to the variety of data items are defined in the processing section 23. The function means will be described with reference to FIG. 1 in each of the embodiments of the present invention.

In addition, reference numeral 13 designates a display section, 24 designates an input section, and 25 designates a reading means.

The processing section 23, the data storage section 14, the display section 13, the input section 24, the receivers 3 and 6, the reading means 25, the azimuth sensor 7, the distance sensor 8, the touch panel controller 12, the touch panel 9, the manipulating section 10 and the voice input section 11 constitute the above-described main unit and the auxiliary device. The azimuth sensor 7, the distance sensor 8 and the like are, in actual fact, the auxiliary devices provided for the main unit.

Figure 9:
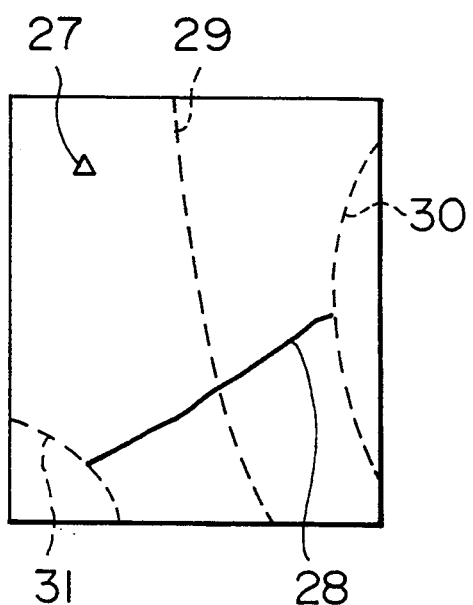
FIGS. 9, 10 and 11 illustrate typical examples of indication made on the screen of the display device in a case where the navigation method according to the present invention is carried out.
Figure 10:
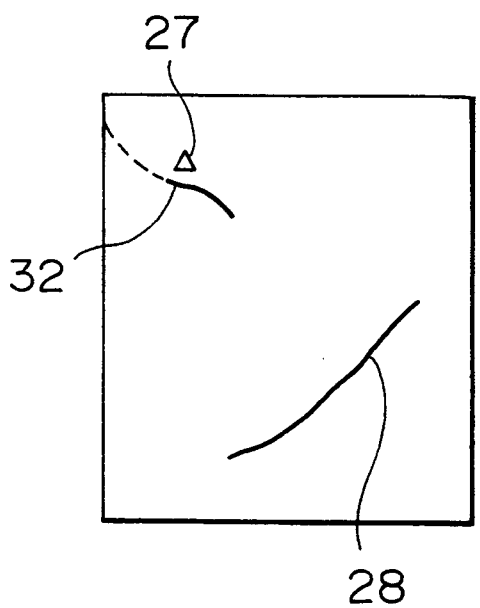
Figure 11:
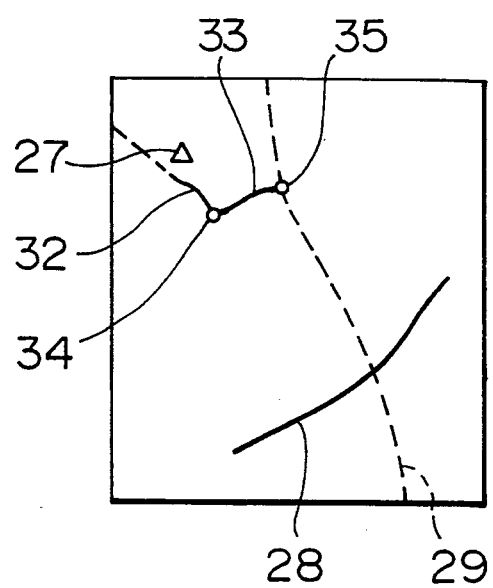

FIGS. 9, 10 and 11 illustrate examples of indication on the screen of the display section 13. Referring to these figures, reference numeral 27 designates a target for the use's vehicle to reach, 28 designates the above-described travelling line, 29, 30 and 31 designate the crossings, 32 designates a passage confronting the target, 33 designates a passage with which the passage confronting the target is able to access a main passage, 34 and 35 designate the intersections.

Then, various embodiments realized by the navigation system thus-constituted will now be described, while assuming a circuit element block having a predetermined processing function in the processing section 23.

Embodiment 1

When information about the passage through which the user's vehicle is moving at this very moment is supplied to the processing section 23 via the input section 24, data about the shape and the position of the passage is read from the data storage section 14 via a retrieval means 15. A display processing means 22 generates a travelling line which represents the passage on the basis of data about the shape and the position of the passage. The travelling line, that is, a line representing the shape and the position of the passage, through which the user's vehicles is moving at this very moment, is indicated on the display section 13.

A variety of ways of supplying information about the passage through which the user's vehicle is moving at this very moment to the input section 24 and the sources of information of this type to be supplied to the input section 24 will be described in each of the embodiments to be described later.

When information about the passage through which the user's vehicle is moving at this very moment is obtained and this passage is indicated, as the travelling line, on the screen of the display section 13, the screen, in principle, always indicates information about the target for the user's vehicle to reach. In a case where the position of the target can be indicated on the display screen, it is preferable that the position of the target should be indicated as information about the target. There have been known the configuration and the method of the conventional navigation system for indicating the position of the target on its display device. An embodiment 24 will be described as an example relating to the configuration for always indicating the travelling line and the position of the target on the display screen. In a case where the position of the target cannot clearly be indicated on the display screen, another information about target is indicated. This case will be described in an embodiment 28.

According to the above-described configuration, the contents indicated on the display section 13, that is, at least the displayed travelling line and the target, enable the driver to instantaneously, easily and clearly recognize the positional relationship between the target and the travelling line. As a result, the driver is able to independently judge and select the preferable course to approach or reach the target while taking the actual state of the travel into consideration.

Furthermore, the present position of the user's vehicle is, as needed, indicated on the display screen.

In general, the passage through which the vehicle travels is formed into data as a segment between two points given coordinate positions. A data base of the navigation system according to the present invention relating to the passage is made as follows.

First, the passages are sectioned so as to be formed into data.

The forming of the passages into data is performed in such a manner that data is constituted in units of links which can be obtained by sectioning the passages at the intersections. Furthermore, a code is given to each link so as to make it to be a subject of a retrieval. If there is a characteristic in the shape of the passage, for example, if there is a sharp curve, the shape sometimes is utilized to express the passage.

Data about the link is, for example, formed into groups to constitute link groups. The link groups are classified as follows so as to be given codes so that data is made.

As to the passages (it is preferable that each of the passages be formed into the same passage for the impression of the driver) which can be respectively considered as one continuous passage in a general rule data is made in such a manner that the start to the end of the passage is made to be one passage and links which constitute this passage are made to be one group to which a code is given.

A point of advancement from another passage is made to be a start point and links which constitute a passage from this start point to the end point are formed into one group which constitutes one link group to which a code is given to make data.

A split point of an exclusive right-turn lane or an exclusive left-turn lane, or that of an exclusive movement lane (or a passage), in which vehicles must move, is arranged to be a start point. Furthermore, a course from this start point to the end point of the passage in which the vehicle moves in this lane is arranged to be one passage and links which constitute this passage are formed into one group so as to be given a code as a link group so that data is made.

In each of the cases, it is preferable that a specific code is given to each link and furthermore a common code is given to each of the links which constitute one group in order to perform a data retrieval on the basis of these codes.

The arrangements are the basic one for making the data base. However, it is preferable that the data base about the passage be varied as described in each of the following embodiments.

Embodiment 2

The transmitter 1 disposed in a passage transmits the signal 2 including data about the shape and the position of the passage. The signal 2 is received by the receiver 3 of the main unit. The signal 2 is supplied to the input section 24 via the reading means 25. At this time, the area of a plane coordinates in which the passage is positioned is read from the data storage section 14 by the retrieval means 15 in accordance with the coordinate position of the passage or the like. The coordinate data and data about the shape and the position of the passage are indicated on the display section 13 by the display processing means 22. It is preferable at this time that sound be generated to inform the user of the receipt of the signal 2 when the same is received. It is preferable that data included in the signal 2 be data about the shape and the position of the passage from the start point to the end point of the passage, assuming that the start point is the point at which the transmitter 1 is disposed, and thereby the coming portion of the travelling line (the distance from the present position of the user's vehicle in the travelling line) be indicated.

Embodiment 3

In the embodiment 2, data about the position of the transmitter 1 is included in the signal 2. As a result, the position of the transmitter 1 is indicated on the screen of the display section 13 in addition to the travelling line.

Embodiment 4

A code is included in the signal 2 transmitted from the transmitter 1 disposed in the passage. On the other hand, data about the shape and the position of the passage which corresponds to the code is stored in the data storage section 14 of the main unit. When the code is, by means of the signal 2, supplied to the processing section 23 via the reading means 25 and the input section 24, data about the shape and the position of the passage is read out from the data storage section 14 by the operation of the retrieval means 15. In accordance with retrieved data, the travelling line representing the shape and the position of the passage is then indicated on the display section 13 by the display processing means 22.

Also in this embodiment, it is preferable that the receipt of the signal 2 be informed to a user when the same is received by the sound.

Embodiment 5

In the embodiment 4, data about the position of the transmitter 1 is included in data to be stored in the data storage section 14 so that the position of the transmitter 1 is indicated on the display section 13 in addition to indicating the travelling line.

Embodiment 6

Data about the shape and the position of all of the passages are stored in the data storage section 14. Therefore, when a user (a driver or another occupant) supplies any one of the name of the passage, that of the intersection, the name of a place, the lot number, the name of a facility positioned on the roadside, the coordinate position or a code number given to it by the key of the manipulating section 10, the touch panel 9, the voice input section 11 or the like, data about the shape and the position of the passage is read from the data storage section 14 by the operations of the input sections 24 and the retrieval means 15. As a result, the travelling line is indicated on the display section 13 on the basis of the function of the display processing means 22.

Embodiment 7

As the equivalent position to be treated in place of the present position of the user's vehicle, position data of a region which is expressed by the intersection and the name of a place or the lot number, that of the point which is indicated by the facility positioned on the roadside or the coordinates are stored in the data storage section 14 so that the equivalent position is indicated on the display section 13 together with the travelling line.

Embodiment 8

Information about the passage through which the user's vehicle is moving at this very moment is supplied via the input section 24 connected to the receiver 6 for receiving the electric waves 5, the receiving 3 for receiving the signal 2, the reading means 25, the distance sensor 7 and the azimuth sensor 8. Information thus-supplied is made in the processing means 16 so that the present place (present position) at which the user's vehicle moves is estimated by a present place estimating means 17. In accordance with the estimated present position, the passage is estimated and discriminated by a passage estimating means 18. After the passage has been discriminated, data about the shape and the position of the passage is read from the data storage section 14 by the retrieval means 15. Furthermore, it is supplied to the display processing means 22 so that the travelling line representing the shape of the passage is indicated on the display section 13.

As a method for discriminating the passage through which the user's vehicle is moving at this very moment in accordance with the estimated present position of the user's vehicle, it is preferable that, for example, an arbitrary points set on the passages are, as data, stored in the data storage section 14 to perform the nearest point retrieval while making the arbitrary points to be the subject. As a method of setting the arbitrary point, it is preferable that plural points should be set at long intervals in one passage in a case where there is no adjacent passage to the one passage, and that the arbitrary point in another passage should be set at a position corresponding to the point set in one passage in a case where there are two passages to be adjacent mutually. As a result of the retrieval performed in such a manner that the arbitrary points are respectively treated as the nearest point to the position of the vehicle, the passage is discriminated by utilizing the nearest points.

According to the above-described embodiment, data is retrieved in accordance with the arbitrary point set in the passage, or a link constituting the discriminated passage to which the arbitrary point belongs. It is preferable that a specific code to a link which constitutes the passage is given in addition to the specific link code to each link to retrieve data about the links. As an alternative to this, it is preferable that a group code for each link group, which is constituted by the links, is given to retrieve data formed into a group by the group code. As an alternative to this, a common code is given to the specific code to the link which constitutes the passage is given to perform retrieval by the common code.

Embodiment 9

In the above-described embodiment 8, a point on the passage nearest to the estimated present position may be, together with the travelling line, indicated on the display section 13.

Embodiment 10

When a passed passage is discriminated upon a comparison made between the shape of a locus (passed passages or passages through which the vehicle has already passed) and the shape of the passage based on the stored data, a passage present in front of the passed passage and through which the vehicle will run if the user's vehicle does not turn right or left is discriminated by a passage discriminating means 18 on the basis of the discriminated passed passage. Then, data about the shape and the position of the discriminated passage is read from the data storage section 14 by the retrieval means 15. As a result, the travelling line is indicated on the display section 13 by means of the display processing means 22.

According to the above-described embodiment, it is preferable that data be retrieved on the basis of the final link which constitutes the passed passage.

It is preferable that a specific code is given to a link which constitutes the passage from the link to the end point of the same to retrieve data about it, in addition to the specific link code to each link. As an alternative to this, it is preferable that a group code for each link group, which is constituted by the links, is given to retrieve data formed into a group by the group code. As an alternative to this, a common code is given to the specific code to the link which constitutes the passage to the end point of the same to perform retrieval by the common code.

Embodiment 11

When the travelling line is indicated on the display section 13, the estimated present position is, as the end point of the locus or the start point of the travelling line, indicated on the display section 13 by means of the display processing means 22.

Embodiment 12

The data storage section 14 stores data about the shape and the position of the passages and, together with the state of advancement at the intersection, stores the distance between intersections and the passages which intersect each passage. When information about the start point is, as the initial positional information, supplied through the input section 24, each intersection is discriminated by an intersection discriminating means 19 on the basis of both of the distance from the start point to each intersection calculated in accordance with the stored data, and the actual running distance measured by the distance sensor 8. In accordance with azimuth information detected by the azimuth sensor 7, the passage into which the vehicle has been advanced at the intersection is discriminated by the passage discriminating means 18. In accordance with information about the result of the discriminations, data about the shape and the position of the passage into which the vehicle has been advanced is read from the data storage section 14 by the retrieval means 15.

According to the above-described embodiment, data constituting the discriminated passage is retrieved. It is preferable that a specific code to a link which constitutes the passage from the most forward link to the end point of the passage is given in addition to the specific link code to the most forward link of the passage into which the vehicle has been advanced to retrieve data about them. As an alternative to this, it is preferable that a group code for each link group, which is constituted by the links, is given to retrieve data formed into a group by the group code. As an alternative to this, a common code is given to a specific code to a link which constitutes the passage to its end point is given to perform retrieval by the common code.

Embodiment 13

It is preferable that the position of the estimated passed-intersection is stored in a storage means 20 to indicate, together with the travelling line, the estimated passed intersection on the display section 13.

Embodiment 14

Although the configuration in the embodiment 12 is arranged in such a manner that the state of the user's vehicle to turn to the right/left is detected by the azimuth sensor 7, this configuration is arranged in such a manner that a user inputs the state of turning to the right/left by any one of the voice input section 11, the touch panel 9, and the key or the switch disposed in the manipulating section 10.

Embodiment 15

The position of the estimated passed-passage is stored in a storage means 20 to display, together with the travelling line, this intersection on the display section 13.

The above-described embodiments 12 and 14 may be modified as follows:

As for the initial movement position, it is preferable that a point is previously set, the position of this point is stored in the data storage section 14 and it is then supplied by means of the code given to the point to set the initial movement position.

When the initial movement position is supplied as the coordinate position of an arbitrary point, the distance from the initial movement position to an intersection at which the vehicle first turns right or left is detected by the distance sensor 8. The detected distance is stored in the storage means 20 and the same is collated with the distance obtained from a means provided in the intersection discriminating means 19 and arranged to calculate the distance from the initial movement position to each intersection. Thus, the intersection at which the user's vehicle has turned right or left is discriminated by the intersection discriminating means 19.

It is preferable that the configuration be arranged in such a manner that, when the user's vehicle has once turned to the right or left at an intersection, this intersection is, as the initial movement position, stored in the storage means 20 so as to discriminate the intersection at which the vehicle will then turn to the right or left on the basis of the stored data.

It is preferable that the distance from a point, which can be set as the initial movement position, to an intersection on a passage near the point is, together with the initial movement position, stored in the data storage section 14 and make it to be collated with the distance detected by the distance sensor 8. It is preferable that a code for the passage to which the point is set is given to data about the point so as to retrieve data about the passage when the point is set as the initial movement position and it is then indicated as the travelling line on the display section 13.

It is preferable that the point, which is previously set as the initial movement position, be a facility which can easily be made to be a mark such as a gasoline station or a roadside restaurant and which relates the travel of the vehicle. In this case, it is supplied as a code given to the facility.

As the point which is previously set as the initial movement position, it is also preferable that a plate or the like which is disposed at the intersection or the passage and given a code number or the like be used.

In a case where the initial movement position is an arbitrary position, it can be set on the screen of the display section 13 by using a cursor or it can be set by means of the latitude and the longitude. In order to calculate the distance, it is preferable that the position be converted into coordinate position.

In a case where the azimuth sensor 7 detects the right turn or the left turn of the user's vehicle, a collation is made between the travelled distance and the detected data about the right turn or the left turn. If there is not subject intersection, it is preferable that the discrimination of the intersection be cancelled. The case takes place when the lane is changed, the vehicle drops in a parking area or a roadside restaurant, or the right turn or the left turn due to a sharp curve passage or the like is detected. When the user inputs the state of the right or the left turn or when azimuth sensor 7 detects it and an effective discrimination of the intersection is thereby made, it is preferable that the cumulative quantity detected by the distance sensor 8 is cancelled and counting is again commenced from zero.

In a case where the user inputs the state of the right turn or the left turn of the user's vehicle, it is preferable that the travelling line is indicated on the display section 13, the nearest intersection positioned forward is shown by an exaggerated enlarged view. Therefore, when the number given to the passage in this enlarged view is input by a key or voice or by directly touching the display screen, the passage to which the user's vehicle will be advanced is discriminated.

As another modification, it is preferable that the state of the advancement be input by voice in such a manner that it is expressed as "right", "upper right", "lower right" and "left". In this case, a configuration can be employed in which each advancement state is given so as to be input by the given number or the same is input in another language such as English.

Another modification may be employed which is constituted in such a manner that keys or switches are disposed at the top end section, the intermediate portion and the lower portion of the right side of the screen frame of the display section 13, the top end portion, the intermediate portion and the lower potion of the left side of the same and the right portion and the left portion of the lower side of the same to correspond to the state of the advancement, that is, the upper right, right, lower right, upper left, left, lower left and U-turn.

Embodiment 16

In a case where information about the passage through which the use's vehicle is moving at this very moment includes information about the present position of the vehicle, data about the shape and the position of the subject passage from the present position to the end point of the passage is retrieved from data stored in the data storage section 14 to indicate the forward portion of the passage through which the vehicle is moving is at this very moment, as the travelling line, on the display section 13 on the basis of the retrieved data.

Embodiment 17

When the travelling line and the locus are indicated on the display section 13, the travelling line and the locus are distinguished from each other (i.e., highlighted) by being indicated with different kinds of lines or different colors.

Embodiment 18

The display mode on the display section 13 may be arranged in such a manner that the shape and the position of the passage through which the user's vehicle is moving at this very moment are indicated as the travelling line, and furthermore, the shape and the position of another passage which intersects the passage through which the user's vehicle is moving at this very moment are indicated as intersection lines 29, 30 and 31.

In this case, it is preferable that the travelling line and the intersection line be distinguished from each other (i.e., highlighted) be being indicated with different colors or different kinds of lines.

Embodiment 19

As a display mode on the display section 13, the position of the intersection may be, together with the travelling line and the intersection line, indicated or the same may be indicated in place of the travelling line and the intersection line.

Embodiment 20

As a display mode on the display section 13, the direction of the travel or the direction in which the vehicle must travel may be indicated by using an arrow or the like in addition to the travelling line.

Embodiment 21

The travelling direction can be indicated on the display section 13 on the basis of the detection of the travelling direction obtained by the azimuth sensor 7.

Furthermore, when the present position is estimated in accordance with the satellite electric waves 5, a means for storing the estimated point and indicating this point on the screen of the display section 13 is provided, wherein the travelling direction is indicated by continuous points, or a direction in the direction of extension of a line connecting two or more continuous points including the final point is defined as the travelling direction, whereby the travelling direction discriminating means 21 discriminates the travelling direction in accordance with the above-made definition so as to indicate the travelling direction on the display section 13 by an arrow or the like.

Embodiment 22

It is preferable that the locus be indicated together with the travelling line on the screen of the display section 12.

Embodiment 23

As a display mode to be made on the display section 13, the present position or the equivalent position in place of the present position can be indicated on the display section 13. Furthermore, it is preferable that the present position or the equivalent position in place of the present position be stored in the storage means 20 and a sequential plurality of stored points are indicated together with the travelling line.

Embodiment 24

The configuration can be formed in such a manner that, in a case where input information for retrieving data about the shape and the position of the passage to be indicated as the travelling line includes information about the present position of the user's vehicle, an area to which both the present position and the target position for the user's vehicle belong is retrieved so as to indicate the area on the display section 13, and in addition, the target position, a travelling line having the present position or the equivalent position in place of the present position thereon may be indicated on the display section 13.

It is preferable that the area to which both the coordinate position of the present position or that of the equivalent position in place of the present position and that of the target coordinate position belong be retrieved. As an alternative to this, it is preferable that codes for a small area and a large area set to several stages as being a different reduced scale to meet a desire are given to a signal transmitted by the transmitter 1, data to be retrieved in response to this signal, data to be retrieved by the name of the intersection, the name of a place, a lot number, the roadside facility or the like which is supplied by the user, data to be retrieved by the present position or the passed passage estimated in accordance with the result of the satellite electric wave or the detection made by each sensor or data to be retrieved by the intersection at which the user's vehicle has been advanced into a different passage. Also data about the target position is given the similar area code, whereby a code which is common to them is retrieved.

It is preferable that the area codes for them be retrieved in such a manner that the sequential collation is started form a small area code to retrieve a code which is common to them. As an alternative to this, the sequential collation is started from a large area code until the area becomes different in a small area, and then a restoration to the common area is made.

As an alternative to this, a configuration can be employed which is arranged in such a manner that a large area to which both the target and the travelling line belong is displayed, a frame which can be moved and the size of which can be changed is provided in the display screen and an area to which both the target and the travelling line belong is determined and selected by the user's operation of the frame so as to display this area. As an alternative to this, either of the target or the travelling line is first indicated on the display screen and the area is sequentially changed to a large area by the user until they belong to the same area.

Embodiment 25

The configuration is constituted in such a manner that the position of a target for the user's vehicle is stored in the data storage section 14 together with data about the shape and the position of the passage at which the target confronts. It is preferable that data about the position of the target be retrieved by the retrieval means 15 when the target is set and data of the shape and the position of the passage which confronts the target be retrieved to indicate the position of the target, the shape and the position of the passage on the display section 13.

If a variety of regulations are applied to the passage, for example, if there is a directional regulation, it may be shown by an arrow or the like or the sections through which the vehicle can or cannot pass in the passage at which the target confronts it may be expressed by different colors or different kinds of lines, on the screen of the display section 13.

It is preferable that the vehicle type regulation, the hour regulation and weight regulation be indicated on the display section 13 on the basis of the selection made by the user.

Embodiment 26

The configuration is constituted in such a manner that data about the shape and the position of the passage which constitutes a course through which the vehicle is able to properly and correctly reach from a main passage adjacent to the target is stored in the data storage section 14. It is preferable that, when a target is set, the target and the shape and the position of the passage through which the vehicle reaches this target be indicated on the screen of the display section 13.

It is preferable that passages constituting a course to be practically advantageous should be indicated on the display screen in accordance with the regulation of the law together with the target, and furthermore the passed intersections and their names, marks for them or the like should be indicated similarly.

It is preferable that the main passage which is connected to the passage indicated together with the target and another passage which is connected to the main passage when the main passage is indicated together with the target are stored in the data storage section 14, whereby, when the above-described another passage is retrieved as the passage for the user's vehicle, a message "target accessed" is informed to the user by voice or image.

Embodiment 27

It is preferable that, when a target is set, a target direction, the start point of which is made to be the present position or an equivalent position in place of the present position, be discriminated by a target direction discriminating means 26 and the discriminated target direction be indicated by an arrow or the like together with the travelling line on the display section 13.

In a case where the travelling line is indicated while being given a priority on the display screen, for example, in a case where the target cannot be indicated on the display screen because an enlarged view is displayed on the screen of the display section 13 as a result of passing through a passage which puzzles the user or a complicated passage, it is preferable that the target direction should be indicated.

Embodiment 28

The configuration can be constituted in such a manner that, when a target is set, the target direction, the start point of which is a central point or an arbitrary point in the area displayed on the display section 13 which indicates the travelling line, is discriminated by the target direction discriminating means 26. The discriminated target direction is, together with the travelling line, indicated by an arrow or the like on the display section 13.

It is preferable that, in a case where the travelling line is indicated while being given a priority on the display screen, for example, in a case where the target cannot be clearly indicated on the display screen because an enlarged view is displayed on the display screen as a result of passing through a passage which puzzles the user or a complicated passage, or in a case where information about the present position cannot be obtained, the target direction should be indicated.

Embodiment 29

It is preferable that, when a novel information item as to the passage through which the user's vehicle is moving at this very moment, which is different from information which has been previously supplied, is supplied, data about the novel passage through which the user's vehicle is moving at this very moment is retrieved in accordance with the novel information item and a corresponding travelling line is indicated on the display screen, both the travelling line to be indicated in accordance with the previous input information and the travelling line to be indicated in accordance with the novel input information should be indicated and they should be indicated by different lines or different colors so as to distinguish them.

Then, the contents of the processing operation to be performed by the processing section 23 will now be described with reference to flow charts shown in FIGS. 2 to 8. The processing operation to be executed by the processing section 23 is the navigation method to be executed by the navigation systems shown in FIG. 1. The operations for respectively performing the navigation methods shown by the above-described flow charts have basically been described in the above-described respective embodiments. Therefore, each navigation operation will now be described while describing the correspondence with the embodiments.

Basically, the navigation method according to the present invention is, as can be seen from the description as to the navigation systems, constituted in such a manner that, when information about the passage through which the user's vehicle is moving at this very moment is supplied to the main unit including the processing section 23, the main unit generates data concerning the travelling line representing the shape and the position of the passage through which the user's vehicle is moving at this very moment in accordance with the information. Then, the travelling line thus-obtained is indicated on the screen of the display section 13 while showing clearly the positional relationship with the target.

Figure 2:
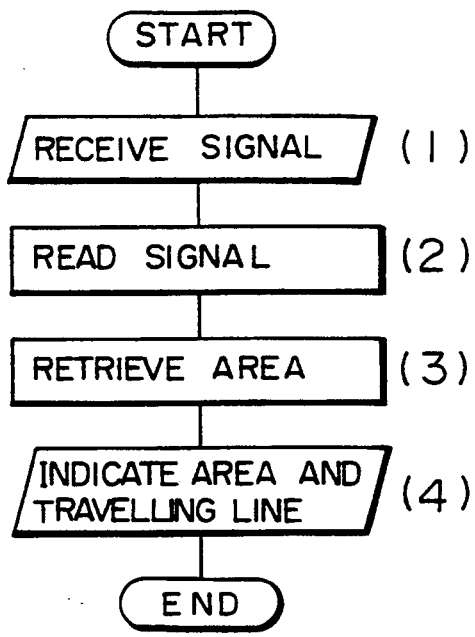
FIG. 2 is a flow chart which corresponds to embodiments 1 and 2.

Specifically, the navigation method according to the present invention is executed as follows:

First, the signal 2 is, as shown in FIG. 2, received by the receiver 3 (step 51). Then, data about the shape and the position of the passage through which the user's vehicle is moving at this very moment is read (step 52) so as to retrieve an area which corresponds to the read passage (step 53). Then, the area and the travelling line are indicated on the screen of the display section 13 (step 54). For example, the signal to be supplied to the receiver 3 is, as described in the embodiment 2, the signal transmitted from the transmitter 1. The above-described navigation method corresponds to, for example, the embodiments 1 and 2.

Figure 3:
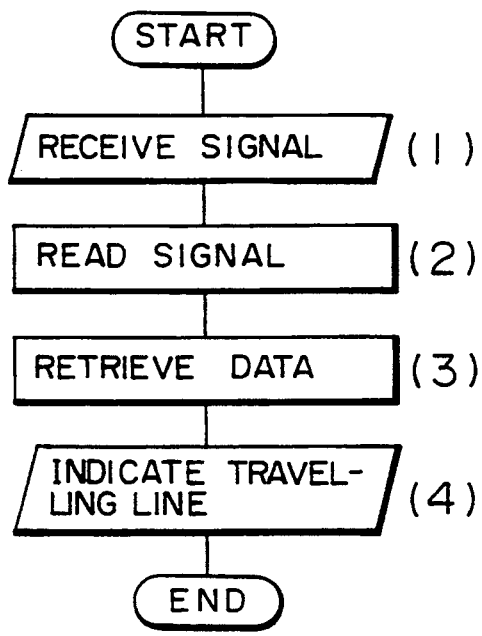
FIG. 3 is a flow chart which corresponds to embodiment 4.

As shown in FIG. 3, the signal including the code is received by the receiver 3 (step 61). Then, the code included in the signal is read (step 62) so as to retrieve data about the passage which corresponds to the above-described code from the data storage section 14 (step 63). Then, the travelling line is indicated on the screen of the display section 13 (step 64). The above-described navigation method corresponds to the embodiment 4.

Figure 4:
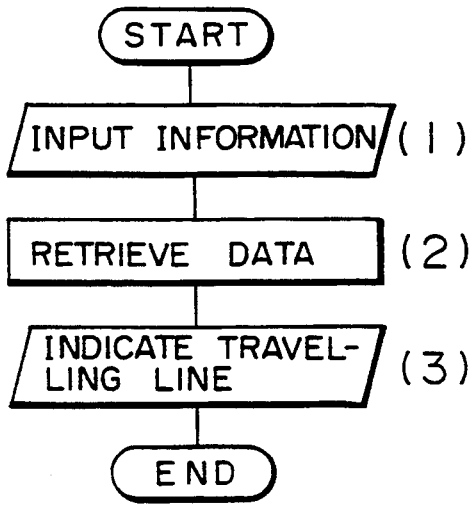
FIG. 4 is a flow chart which corresponds to embodiment 6.

Another navigation method is, as shown in FIG. 4, constituted in such a manner that information about the passage through which the user's vehicle is moving at this very moment is supplied by the user by operating the manipulating section 10 or the like (step 71). Then, data about the passage which corresponds to supplied information is retrieved from the data storage section 14 (step 72) so as to indicate the travelling line representing the shape and the position of the retrieved passage on the screen of the display section 13 (step 73). The above-described navigation method corresponds to the embodiment 6.

Figure 5:
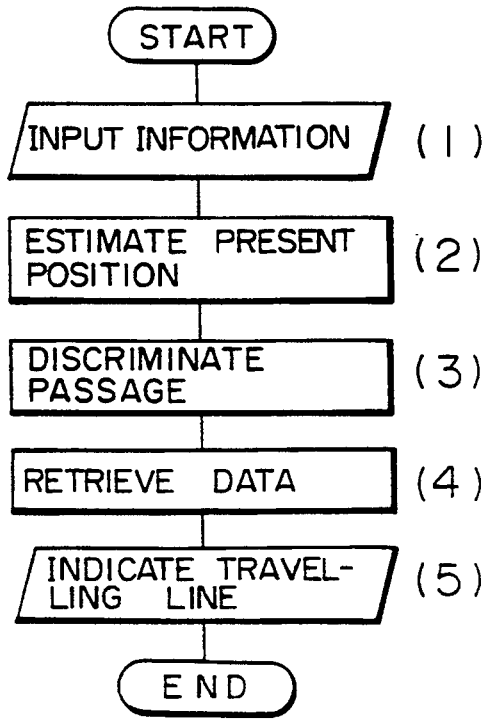
FIG. 5 is a flow chart which corresponds to embodiment 8.

Another navigation method is arranged in such a manner that, when information obtained from the satellite electric waves 5 or the sensors 8 and 10 is, as shown in FIG. 5, supplied (step 81), the present position of the user's vehicle is estimated in accordance with supplied information (step 82). Then, the passage corresponding to the estimated present position is discriminated (step 83) so that data for indicating the travelling line which corresponds to the above-described passage is retrieved from the data storage section 14 (step 84). Then, the travelling line is indicated on the screen of the display section 13 (step 85). The above-described navigation method corresponds to the embodiment 8.

A further navigation method is, as shown in FIG. 6, constituted in such a manner that, when information of the satellite electric wave 5 or that obtained as a result of the detection performed by the sensors 8 and 10 is supplied (step 91), the present position of the user's vehicle is estimated in accordance with the supplied information and a locus for the user's vehicle is obtained in accordance with a plurality of estimated present positions (step 92). Then, the locus thus-obtained and a passage stored in the data storage section 14 are subjected to a comparison (step 93). As a result of this comparison, the passed passage is discriminated (step 94) so as to retrieve data about the forward passage from the data storage section 14 in accordance with the passed passage (step 95). Then, a travelling line representing the shape and the position of the retrieved passage is indicated on the screen of the display section 13 (step 96). The above-described navigation method corresponds to the embodiment 10.

Another navigation method is, as shown in FIG. 7, arranged in such a manner that the initial movement position is set (step 101). Then, the travelled distance from the initial movement position is detected (step 102) so as to store the detected travelled distance (step 103). Furthermore, the distance from the initial movement position to each intersection is obtained in accordance with data (step 104). Then, the intersection which is passed is estimated from the result of a comparison made between the above-described distance and the above-described detected travelled distance (step 105). Then, the state of the advancement into the intersection is detected (step 106) to estimate the advanced passage (step 107), retrieve data about the advanced passage (step 108) and indicate the travelling line on the screen of the display section 13 in accordance with the retrieved data (step 109). The above-described navigation method corresponds to the embodiment 12.

The navigation method shown in FIG. 7 may be arranged in such a manner that the travelling line is indicated by a user by inputting the state of the advancement into the intersection by operating the manipulating section 10 in step 106.

Another navigation method is, as shown in FIG. 8, arranged in such a manner that, when the name or the code of a target is supplied (step 111), data about the target is retrieved (step 112) and the target is indicated on the screen of the display section 13 in accordance with the data (step 113). If information about the passage through which the user's vehicle is moving at this very moment is supplied at this time (step 114), a signal concerning the information is read or data concerning the passage is retrieved (step 115). Then, an area to which both the present position or an equivalent position in place of the present position and the target belong is retrieved (step 116) so that the above-described area is displayed on the screen of the display section 13. Thus, the target and the travelling line are indicated on the display screen (step 117). The above-described navigation method corresponds to the embodiment 24.

Industrial Applicability

As described above, the navigation system and the method therefor according to the present invention are optimum for being mounted on a vehicle for use by a driver. Furthermore, it can be used as a portable navigation system for a pedestrian.

I claim:

1. A navigation system that displays a road on which an object is located, without displaying a route to a target comprising a main unit including a storage device, a central processing device, an input device and a display device, said main unit being mounted on the moving object and including:

road information receiving means for receiving information about a shape and a position of a road through which said moving object is moving from at least one of an external device positioned externally of said main unit and an auxiliary device provided for said main unit, said shape of said road being determined assuming that said moving object moves along said road without changing said road;

a target information indicating means for indicating information about the target for said moving object to reach on a screen of said display device;

travelling line generating means for generating a single travelling line representing only said shape of said road through which said moving object is moving on the basis of said information about the shape and the position of said road that said road information receiving means receives, said travelling line generating means changing said single travelling line when said road information receiving means receives information indicating that the moving object has changed roads; and a display processing means for displaying said generated single travelling line on the screen of said display device while indicating the positional relationship of said single travelling line with said information about said target, said display processing means displaying said single travelling line so that said single travelling line is highlighted with respect to other lines displayed on said screen, wherein said single travelling line displayed on said screen is changed when said moving object changes roads.

2. A navigation system according to claim 1, wherein said external device is a transmitting device disposed in each road, said transmitting device having data supplying means for supplying data about the shape and the position of said road in which said transmitting device is disposed in the form of a signal transmitted from said transmitting device;

said storage device stores data about plane coordinates of areas;

said main unit has receiving means for receiving said signal transmitted from said transmitting device and reading means for reading said data from said signal received by said receiving means;

said central processing device has retrieval means for retrieving one of said areas on said plane coordinates in which said road exists, from said storage device, on the basis of said data obtained by said reading means; and said road information receiving means retrieves said data about the shape and the position of said road from an output signal output from said reading means, and said travelling line generating means generates said single travelling line representing only said shape of said road on the basis of both said area obtained by said retrieval means and said data about the shape and the position of said road obtained by said road information receiving means.

3. A navigation system according to claim 1, wherein said external device is a transmitting device disposed in each road;

said transmitting device has code supplying means for supplying a specific code for said transmitting device to a signal transmitted from said transmitting device;

said storage device stores data about the shape and the position of said each road;

said main unit has receiving means for receiving said signal transmitted from said transmitting device and reading means for reading said code from said signal received by said receiving means;

said central processing device has retrieval means for retrieving data about the shape and the position of said road in which said transmitting device is disposed from said data stored in said data storage device on the basis of said code obtained by said reading means; and said travelling line generating means generates said single travelling line representing only said shape of said road on the basis of said data about the shape and the position of said road obtained by said retrieval means.

4. A navigation system according to claim 1, wherein said auxiliary device is an input manipulating device for inputting various information items to said input device, said information items being operator recognized items for specifying said road during travelling of said road by the operator;

said storage device stores data about the shape and the position of each road;

said central processing device has retrieval means for retrieving data about the shape and the position of a corresponding road from said storage device when said operator inputs said various information items into said input device by operating said input manipulating device; and said travelling line generating means generates said single travelling line representing only said shape of said road on the basis of said data obtained by said retrieval means.

5. A navigation system according to claim 4, wherein said various information items are any one of the name of a road, the name of an intersection, the name of a place, a lot number, the name of a facility on the roadside and the coordinate position, or a code number given to each of these information items.

6. A navigation system according to claim 1, wherein said external device is a satellite for emitting electric waves including positional information;
said storage device stores data about the shape and the position of each passage;
said central processing device includes present position estimating means for estimating the present position of said moving object on the basis of said electric wave emitted from said satellite, passage discriminating means for discriminating a passage nearest to said present position when said present position is obtained by said present position estimating means, and retrieving means for retrieving data about the shape and the position of said road from data stored in said storage device; and
said travelling line generating means generates said single travelling line representing only said shape of said road on the basis of said data about the shape and the position of said road obtained by said retrieval means.

7. A navigation system according to claim 6, wherein said central processing device has retrieval means for retrieving data about a point near said estimated present position and said display processing means indicates said retrieved point on said single travelling line displayed on said display device.

8. A navigation system according to claim 1, wherein said external device is a satellite for emitting electric waves including positional information;
said storage device stores data about the shape and the position of each road;
said central processing device includes a present position estimating means for estimating the present position of said moving object on the basis of said electric waves emitted from said satellite, a road discriminating means for discriminating a passed road by comparing a locus obtained on the basis of said estimated present position and said shape of said road stored in said storage device, and retrieving means for, using data stored in said storage device, retrieving data about the shape and the position of a road which is in front of said passed road and will be a passage when no turning to right/left is made, when said passed road is discriminated as a result of the comparison; and
said travelling line generating means generates said single travelling line representing only said shape of said road through which said moving object is moving on the basis of said retrieved data.

9. A navigation system according to claim 8, wherein said single travelling line is indicated in such a manner that said estimated present position is made to be the start point of said single travelling line.

10. A navigation system according to claim 1, wherein
said auxiliary device includes a distance sensor for detecting a travelled distance and an azimuth sensor for detecting a direction of a travel;
said storage device stores data about the shape and the position of each road, roads intersecting each road, a state of advancement at each intersection and the distance between intersections in each road;
said central processing device has means for setting an initial movement position, means for storing the detected quantity of the distance from said initial movement position detected by said distance sensor, means for obtaining the distance from said initial movement position to each intersection, means for collating said distance and said detected quantity, means for estimating intersections passed at the time of said detection when said collation has been made, means for, when said azimuth sensor detects the state of advancement into an intersection, estimating a road into which an advancement is made on the basis of said detected state and means for retrieving data about the shape and the position of said road into which said advancement is made from data stored in said storage device; and
said travelling line generating means generates said single travelling line representing only said shape of said road on the basis of said retrieved data.

11. A navigation system according to claim 1, wherein
said auxiliary device includes a distance sensor for detecting a travelled distance and input manipulating means for inputting, by an operator, a state of advancement at an intersection from a road through which a moving object is moving to another road;
said storage device stores data about the shape and the position of each road, roads intersecting each road, a state of advancement at an intersection and distance between intersections in each road;
said central processing device has means for setting an initial movement position, means for storing the detected quantity of the distance from said initial movement position detected by said distance sensor, means for obtaining the distance from said initial movement position to each intersection, means for collating said distance and said detected quantity, means for estimating intersections passed at the time of said detection when said collation has been made, means for estimating a road into which an advancement is made on the basis of said state of advancement into another road at said intersection supplied by said operator, and means for retrieving data about the shape and the position of said road into which said advancement is made from data stored in said storage device; and
said travelling line generating means generates said single travelling line representing only said shape of said road on the basis of said retrieved data.

12. A navigation system according to claim 1, wherein
said central processing device has retrieval means for retrieving data about the shape and the position of said road from the present position of said moving object to the end point of said road through which said moving object is moving in a case where information about the present position is objected on the basis of said information about the shape and the position of said road through which said moving object is moving; and
said display processing means includes forward portion displaying means for displaying a forward portion of said road through which said moving object is moving as said single travelling line representing only said shape of said road on the screen of said display device on the basis of said retrieved data.

13. A navigation system according to claim 2, wherein said data supplied from said transmitting device includes data about the shape and the position of another road which intersects said road through which said moving object is moving, and a line representing said another road through which said moving object is moving, displayed on the screen of said display device as an intersection line.

14. A navigation system according to claim 3, wherein said storage device stores data about the shape and the position of each road and data about the shape and the position of a road which intersects each of said roads, said retrieval means as well as retrieves data about the shape and the position of said road which intersects said road when said retrieval means retrieves data about the shape and the position of said road in which said transmitting device is disposed from data stored in said storage device, and along with said single travelling line representing only said shape of said road through which said moving object is moving, a line representing said other road is displayed on the screen of said display device as an intersection line.

15. A navigation system according to claim 1, wherein in a case where information about the present position of said moving object is included in said information obtained by said road information receiving means about the shape and the position of said road through which said moving object is moving, an area to which both said present position and the position of said target belong is retrieved, and said target and said single travelling line on which said present position or an equivalent position in place of said present position is present are displayed on the screen of said display device.

16. A navigation system according to claim 15, wherein said storage device stores said position of said target by means of the coordinate position and data about the shape and the position of a road which confronts said target, said data about said position of said target is retrieved when a target is set, also data about the shape and the position of said road which confronts said target is retrieved, and said target and a line representing said road which confronts said target are indicated on the screen of said display device.

17. A navigation system according to claim 16, wherein said storage device further stores data about the shape and the position of a road which constitutes a course which properly correctly reaches said target from a main road near said target, data about said target and data about the shape and the position of said road which confronts said target are retrieved when a target is set, also data about the shape and the position of said road which constitutes said course is retrieved and said position of said target, a line representing said road which confronts said target and a line representing said road which constitutes said course are displayed on the screen of said display device.

18. A navigation system according to claim 1, wherein said central processing device has means for retrieving a direction of said target while making an arbitrary point of an area displayed on the screen of said display device to be a start point when said target is set and said display processing means displays said single travelling line representing only said shape of said road and an arrow representing said direction of said target on the screen of said display device.

19. A navigation system according to claim 1, wherein when, as to said road through which said moving object is moving, novel information different from said information which has been supplied is supplied, said data is retrieved on the basis of said novel information and a line corresponding to said novel information is displayed on said display device on the basis of said retrieved data, single travelling line generated by said previous information and said line generated by said novel information and displayed together on the screen of said display device in such a manner that said two lines are indicated by different kinds of lines or different colors.

20. A navigation system according to claim 1, wherein said auxiliary device is a distance sensor for detecting a travelled distance and an azimuth sensor for detecting a travelling direction;

said storage device stores data about the shape and the position of each road;

said central processing device includes present position estimating means for estimating the present position of said moving object on the basis of positional information detected by said distance sensor and said azimuth sensor, road discriminating means for discriminating, when said present position is obtained by said present position estimating means, a road which is nearest to said present position and retrieval means for retrieving data about the shape and the position of said road from data stored in said storage device; and said travelling line generating means generates said single travelling line representing only said shape of said road on the basis of said data about the shape and the position of said road obtained by said retrieval means.

21. A navigation system according to claim 1, wherein said auxiliary device is a distance sensor for detecting the travelled distance and an azimuth sensor for detecting a travelling direction;

said storage device stores data about the shape and the position of each road;

said central processing device includes present position estimating means for estimating the present position detected by said distance sensor and said azimuth sensor, road discriminating means for obtaining a locus on the basis of said estimated present position, comparing said locus and the shape of said road stored in said storage device and discriminating a passed road and retrieval means for, when said passed road has been discriminated after said comparison between said locus and said shape of said road has been performed, retrieving data about the shape and the position of a road in front of said road and through which said moving object travels if the same does not turn right or left from data stored in said storage device; and said travelling line generating means generates said single travelling line representing only said shape of said road through which said moving object is moving on the basis of said retrieved data.

22. A navigation method of generating information about a moving state of a moving object and displaying said information on a display device, said navigation method displaying a road on which the moving object is located without displaying a route to a target and comprising the steps of:

setting information about the target for said moving object to reach;

obtaining information about a shape and a position of a road through which said moving object is moving, said shape of said road being determined assuming that said moving object moves along said road without changing said road;

generating a single travelling line representing only said shape of said road through which said moving object is moving on the basis of said information about the shape and the position of said road, said generated single travelling line changing when said information about the shape and the position of the road indicates that the moving object has changed roads; and displaying both of said information about said target and said single travelling line on a screen of said display device, wherein said single travelling line on said screen is changed whenever said moving object changes roads, said single travelling line being displayed so that said single travelling line is highlighted in a manner that is distinct from other line on said screen.

23. A navigation system according to claim 22, wherein said information about the shape and the position of said road through which said moving object is moving is obtained by receiving a signal including data about the shape and the position of said road through which said moving object is moving that is transmitted from a transmitting device disposed in each road.

24. A navigation system according to claim 22, wherein a signal including a code for specifying said road through which said moving object is moving is transmitted from a transmitting device disposed in each road, and said information about the shape and the position of said road is obtained by receiving said signal and based on data stored in a storage device.

25. A navigation system according to claim 22, wherein an operator inputs various information items which are recognized at the time of a movement through said road as items for specifying said road, and said information about the shape and the position of said road is generated on the basis of said various information items.

26. A navigation system according to claim 25, wherein said various items are any one of the name of a road, the name of an intersection, the name of a place, a lot number, the name of a facility on a roadside, a coordinate position or a code number given to these information items.

27. A navigation method according to claim 22, wherein electric waves including positional information and emitted from a satellite are received, the present position of said moving object is estimated on the basis of said positional information supplied from said satellite, a road which is nearest to said present position is discriminated when said present position is obtained and said information about the shape and the position of said road is generated on the basis of said nearest road.

28. A navigation method according to claim 27, wherein data about a point near said estimated present position is retrieved and said retrieved point is indicated on said single travelling line displayed on said display device.

29. A navigation method according to claim 22, wherein the present position of said moving object is estimated, the travelling locus of said moving object is obtained on the basis of said estimated present position, said locus thus-obtained is subjected to a comparison with previously-prepared data about the shape and the position of a road, a road in which the latest present position is included is obtained by making a retrieval and a line representing said retrieved road is displayed on said screen of said display device.

30. A navigation method according to claim 29, wherein the indication is performed in such a manner that said estimated present position is made to be the initial end portion of said single travelling line.

31. A navigation method according to claim 22, wherein data about the shape and the position of each road, roads intersecting each road, the state of advancement at each intersection and the distance between intersections in each road are previously prepared in a storage device, the distance from an initial movement position is detected by a distance sensor to store it in a case where said initial movement position is set, the distance from said initial movement position to each intersection is obtained, said distance and said detected quantity are compared with each other, an intersection which is passed at the time of detection is estimated, a road into which said moving object has been advanced is estimated on the basis of the detected state of said advancement into said intersection when the same is detected, data about the shape and the position of said road in which said moving object has been advanced is retrieved from data stored in said storage device, a line representing said road is generated on the basis of said retrieved data and said line is indicated on said display device.

32. A navigation method according to claim 22, wherein a distance sensor for detecting the travelled distance and input manipulating means for, by an operator, inputting the state of an advancement from a road through which said moving object is moving into another road at an intersection are utilized;

data about the shape and the position of each road, roads intersecting each road, the state of advancement at each intersection and the distance between intersection in each road are previously prepared in a storage device;

when an initial movement is set, the distance from said initial movement position is detected by said distance sensor to store it, the distance from said initial movement position to each intersection is obtained, said distance and said detected quantity are compared, an intersection which is passed at the time of detection is estimated, said road into which said moving object has been advanced is estimated from the state of advancement into another road at said intersection supplied by said operator, data about the shape and the position of said road into which said moving object has been advanced is retrieved from data stored in said storage device, a line representing said road is generated on the basis of said retrieved data and said line is indicated on said display device.

33. A navigation method according to claim 22, wherein
in a case where information about the present position of said moving object is obtained on the basis of said information about the shape and the position of said road through which said moving object is moving, data about the shape and the position of said road from said present position to the end position of said road through which said moving object is moving is retrieved from data stored in said storage device and the forward portion of said road through which said moving object is moving is, as said single travelling line representing only said shape of said road, displayed on said display device on the basis of said retrieved data.

34. A navigation method according to claim 22, wherein
another road intersecting said road through which said moving object is moving is, as a line intersecting said single travelling line, displayed on said display device.

35. A navigation method according to claim 22, wherein
in a case where information about the present position of said moving object is included in information about the shape and the position of said road though which said moving object is moving, said present position or an equivalent position in place of said present position is indicated on said single travelling line.

36. A navigation method according to claim 22, wherein
a line representing a road confronting said target is displayed on the screen of said display device.

37. A navigation method according to claim 36, wherein
said line representing said road confronting said target, a line representing a main road near said target and a line representing a road which constitutes a course through which said moving object is able to properly correctly reach said target from said main road are displayed on the screen of said display device.

38. A navigation method according to claim 22, wherein
when a target is set, a direction of said target is retrieved while making an arbitrary point in an area displayed on the screen of said display device to be a start point and single travelling line representing said road and an arrow representing said direction of said target are displayed on the screen of said display device.

39. A navigation method according to claim 22, wherein
when novel information about said road through which said moving object is moving different from previous information which has been supplied is supplied, said data is retrieved on the basis of said novel information and a line corresponding to said novel information is indicated on said display device on the basis of said retrieval data, said single travelling line generated by said previous information and said line generated by said novel information are displayed together on the screen of said display device in such a manner that said two lines are indicated by different kinds of lines or different colors.

* * * * *